United States Patent [19]

Hölter

[11] 4,289,509

[45] Sep. 15, 1981

[54] DUST ASPIRATING ARRANGEMENT

[76] Inventor: Heinz Hölter, Beisenstrasse 39-41, 4390 Gladbeck, Fed. Rep. of Germany

[21] Appl. No.: 72,782

[22] Filed: Sep. 5, 1979

Related U.S. Application Data

[63] Continuation of Ser. No. 930,981, Aug. 4, 1978, abandoned.

[51] Int. Cl.³ .................... B01D 47/06; E21C 7/08
[52] U.S. Cl. .................... 55/257 PV; 55/385 D; 261/DIG. 54; 299/12
[58] Field of Search ............... 261/DIG. 54, 115, 116; 55/257 PV, 385 D; 299/12, 64-68; 98/50

[56] References Cited

U.S. PATENT DOCUMENTS

| | | | |
|---|---|---|---|
| 2,070,920 | 2/1937 | Pray | 299/12 |
| 3,172,143 | 3/1965 | Yucis et al. | 55/257 PV |
| 3,387,889 | 6/1968 | Ziemba et al. | 299/12 |
| 3,700,284 | 10/1972 | Agnew | 55/385 D |
| 3,712,678 | 1/1973 | Amoroso | 299/12 |
| 3,792,568 | 2/1974 | Gundlach et al. | 55/385 D |
| 3,795,089 | 3/1974 | Reither | 55/257 PV |
| 3,815,332 | 6/1974 | Bobrowsky et al. | 55/244 |
| 3,876,396 | 4/1975 | Arnold et al. | 55/257 PV |
| 4,061,478 | 12/1977 | Hartwick | 55/257 PV |
| 4,076,315 | 2/1978 | Gundlach et al. | 55/385 D |

*Primary Examiner*—Gregory N. Clements
*Attorney, Agent, or Firm*—Michael J. Striker

[57] ABSTRACT

A dust aspirating arrangement, particularly for underground applications, has a suction element arranged for aspirating air which contains dust generated during operation of an underground machine, an agglomerating section communicating with the suction element and arranged for receiving the dust-containing air aspirated by the latter in which agglomerating section a mixture of a moisture and the dust-containing air is produced, a separating element communicating with the agglomerating section and operative for separating the mixture into its constituent dust-containing moisture and air and provided with a flexible conduit for removing the separated dust-containing moisture, and a removing element for removing the separated air from the separating element and located downstream of the flexible conduit. The agglomerating section is provided with a moisturizing element arranged for moisturizing the dust-containing air, and with a stationary wall portion arranged for inducing the moisture and the dust-containing air toward a central region of agglomerating section so as to produce the above-mentioned mixture.

14 Claims, 3 Drawing Figures

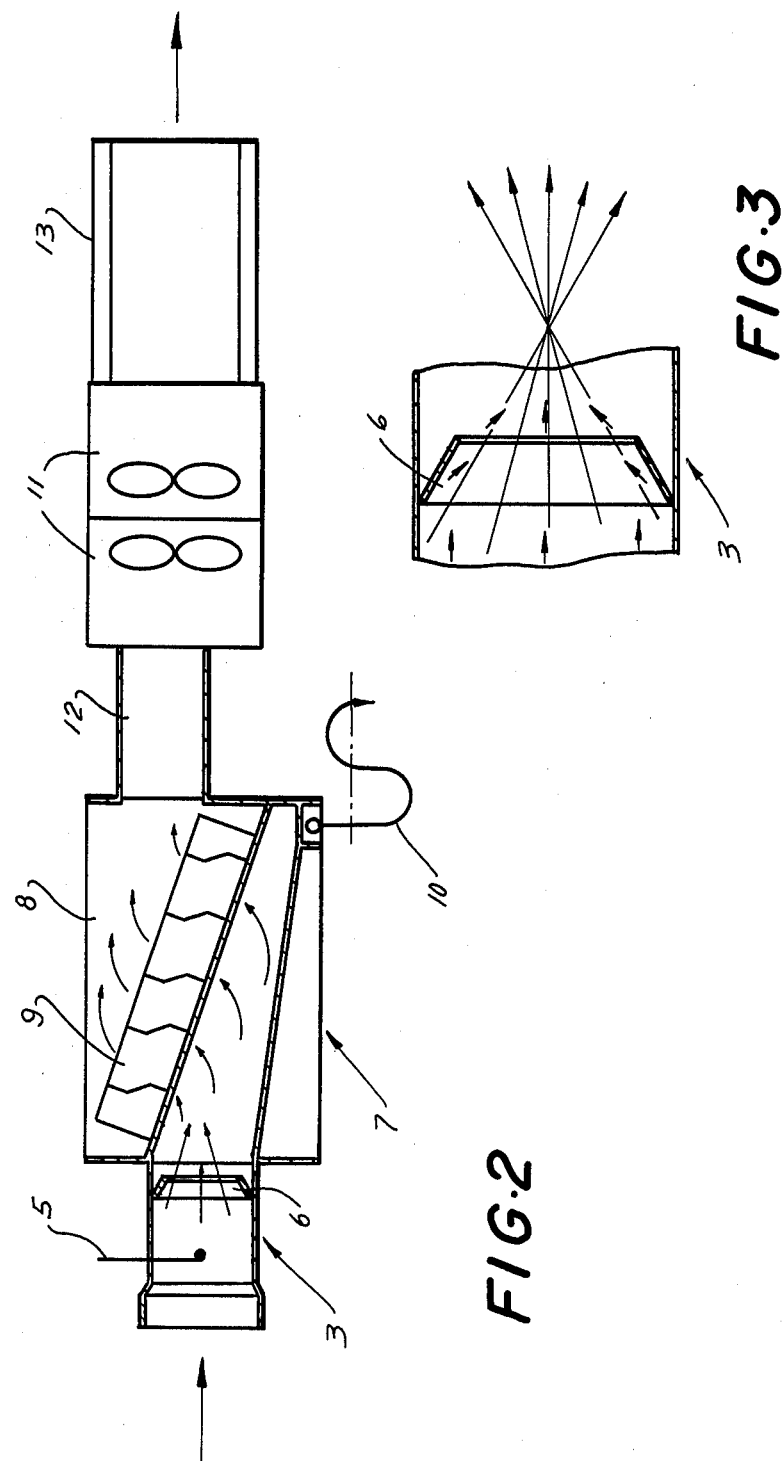

DUST ASPIRATING ARRANGEMENT

This is a continuation of application Ser. No. 930,981, filed Aug. 4, 1978, now abandoned.

BACKGROUND OF THE INVENTION

The present invention relates to a dust aspirating arrangement, particularly for underground applications, for instance for development and mining machines.

Dust aspirating arrangements for underground operations are known in the art. Dust which is generated during the operation of underground machines, on the one hand, is a health hazard. Even if such is not the case, dust in the air worsens visibility which results in a considerable reduction of machine operating capacity. A dust aspirating arrangement must have small dimensions that the it can be mounted on the frame of the machine without affecting cutting or extracting operations. In order to construct dust aspirating arrangements having small dimensions, it has been proposed to provide in such arrangements a ventilator and to supply the same with moisture so as to obtain efficient mixing and contacting of the dust with the moisture. The thus-produced mixture is then admitted into a separator where dust and moisture are separated from the air, whereupon the latter is readmitted into the underground working space.

In a known arrangement the ventilator is arranged in a mixture chamber wherein a mixture of the moisture and dust-containing air is produced. If the dust which is produced during operation of the machine tends to have adhesive characteristics, the mixture of such machine with the moisture forms a clay which tends to cake. This cake encrustates the ventilator and causes imbalances of ventilator blades so that they must be frequently cleaned. At the same time, this results in bearing wear so that the bearings must be frequently repaired or replaced.

SUMMARY OF THE INVENTION

Accordingly, it is an object of the present invention to provide a dust aspirating arrangement, particularly for underground applications, which avoids the disadvantages of the prior art.

More particularly, it is an object of the present invention to provide a dust aspirating arrangement which does not have rotatable and movable parts onto which the dust generated during operation of an underground machine could be deposited and could cause imbalance of the same.

In keeping with these objects, and with others which will become apparent hereinafter, one feature of the present invention resides, briefly stated, in a dust aspirating arrangement having suction means for aspirating air which contains dust generated during the operation of an underground machine, agglomerting means communicating with the suction means and arranged for receiving the dust-containing air aspirated by the latter and a moistening liquid to thereby produce a mixture, separating means for separating the mixture into its constituent dust-containing liquid and air, a conduit for removing the separated dust-containing liquid, and means for removing the separated air from the separating means, the agglomerating means being provided with a stationary wall portion arranged for inducing the liquid and dust-containing air toward a central region of the agglomerating means, the conduit for removing the dust-containing liquid being flexible, and the means for removing separated air being located downstream of the flexible conduit.

In such a construction, the rotatable blades of the prior-art ventilator are replaced by the stationary wall portion which is utilized for inducing the moisture and dust-containing air toward a central region of the agglomerating means. Thus, any possibility of imbalance of a rotatable part resulting from encrustation of the latter is eliminated. The flexible conduit performs the functions of removing the separated dust-containing moisture from the separating means so that no pumps or the like means are needed. Finally, the means for removing the separated air from separating means is located downstream of the flexible conduit, whereby the air removing means is not subjected to the action of the dust inasmuch as the latter has been removed upstream of the air removing means through the flexible conduit.

Another feature of the present invention is that the suction means includes an angled tubular element which has two portions each having an inlet arranged for aspirating the dust-containing air. The suction means also includes a source of suction communicating with the angled element so as to aspirate the dust-containing air into the latter. At the same time the source of suction also communicates with the air removing means so as to simultaneously remove the separated air from the separating means through the removing means. The source of suction may be formed as a blower. The means for removing the separated air may be formed as a conduit which is open into the separating means and communicates with the blower so that the separated air is removed from the separating means through the conduit under the action of the blower.

Still another feature of the present invention is that the arrangement has flexible connecting means arranged for pivotally connecting and communicating the angled tubular element of the suction means with the agglomerating means. The connecting means may be formed as a flexible conduit.

A further feature of the present invention is that the separating means includes a plurality of blade members. The separating means may have a casing bounding a chamber and a frame member located in the chamber and supporting the blade members.

Still a further feature of the present invention is that the agglomerating means includes a tubular member bounding an inner passage and having a curved section which forms a stationary wall portion and reinforces the tubular member. At the same time, the wall portion may be formed as a separate member located in the inner passage of the tubular member of the agglomerating means. The wall portion bounds a further inner passage which converges in a direction toward the separating means and induces the dust-containing air and the moistening liquid into the central region of the agglomerating means. Such a further inner passage may be cup-shaped.

Yet another important feature of the present invention is that the flexible conduit for removing the dust-containing liquid from the separating means is a curved siphon-type conduit. When the means for removing the dust-containing liquid is so formed, the dust-containing liquid may be completely and unimpededly removed from the separating means through the siphon-type conduit, and back flow of the liquid is reliably prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a fragmentary enlarged view of some parts of the dust aspirating arrangement; and FIG. 3 is an enlarged view showing a wall portion of the agglomerating means of the dust aspirating arrangement.

DESCRIPTION OF A PREFERRED EMBODIMENT

Figure 1:
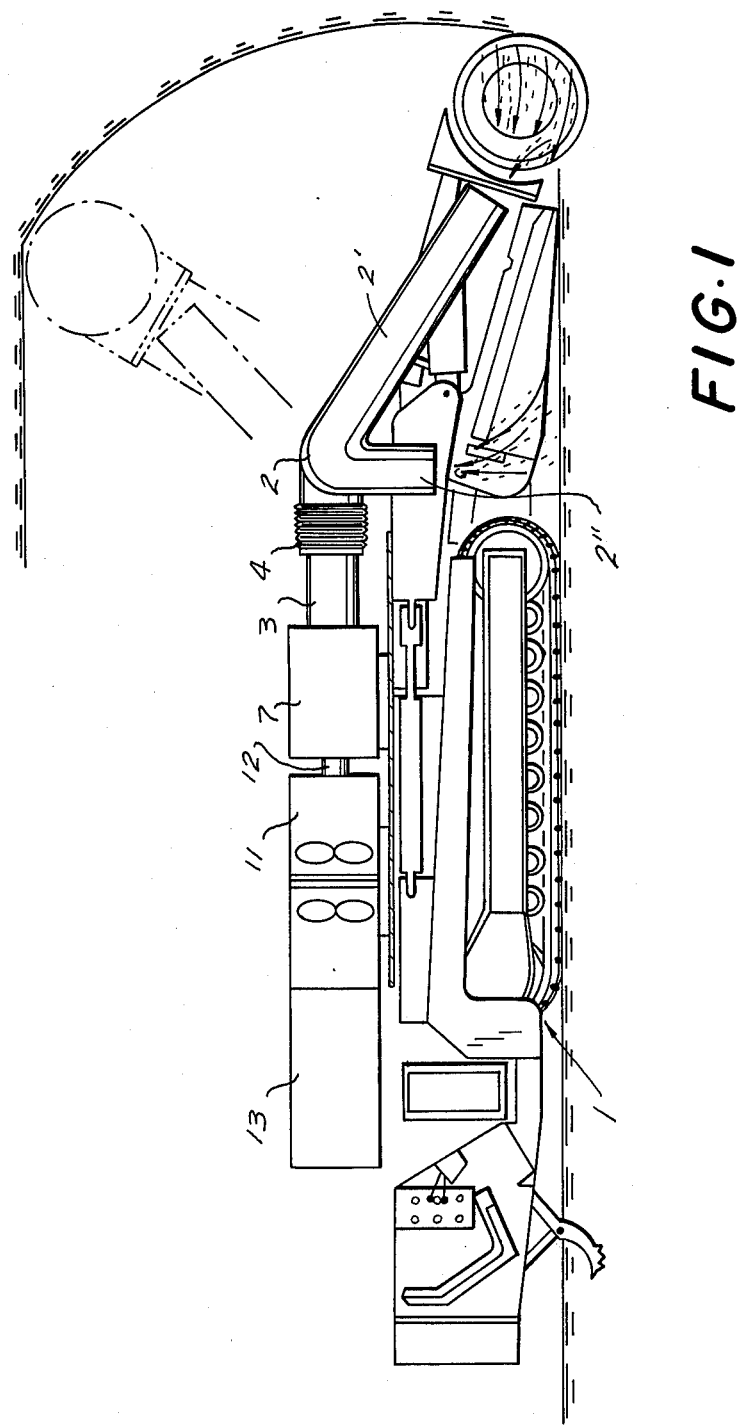
FIG. 1 is a lateral view of an underground machine with a dust aspirating arrangement in accordance with the present invention.

A dust aspirating arrangement in accordance with the present invention is mounted on a machine for underground applications, for instance on a development or mining machine which is identified in toto by reference numeral 1. The arrangement has suction means which includes an angled tubular element 2. The tubular element 2 is connected with parts of the machine so as to be moved together with a tool of the machine. The angled tubular element 2 has two portions identified by reference numerals 2' and 2" and each having an inlet. The portions 2' and 2" of the angled tubular element 2 are so arranged that the first-mentioned portion 2' aspirates dust in the region adjacent to the tool of the machine wherein the dust is generated during the operation of the latter. The second mentioned portion 2" aspirates the dust in the region of a floor or in the region of a conveyor to which the dust is advanced during the operation. As shown in the drawing, the portion 2" may be shorter than the portion 2" of the tubular element 2.

The arrangement has an agglomerating means or section which is identified by reference numeral 3. The agglomerating section 3 is connected and communicates with the tubular element 2 by means of a conduit 4. The conduit 4 is formed as a flexible moving joint which pivotally connects the tubular element 2 with the agglomerating section 3. In such a construction the tubular element 2 can move together with the tool of the machine or with an arm carrying the tool into any desired position, whereas the agglomerating section remains immovable.

As can be seen particularly from FIG. 2, the agglomerating section is provided with a moisturizing element which is identified by reference numeral 5. The moisturizing element 5 is arranged for moisturizing the dust-containing air which is received into the agglomerating section 3 from the tubular element 2 through the connecting conduit 4. The moisturing element 5 may be formed as one or several nozzles. A stationary wall portion 6 is located in the agglomerating section 3. The wall portion 6 is arranged for inducing edge moistening liquid supplied by the element 5 and the dust-containing air toward a central region of the agglomerating section 3. Thereby, production of a fine mixture of the liquid and the dust-containing air is guaranteed. The wall portion 6 is located in an inner passage of the agglomerating section 3 and bounds a further inner passage which converges in a direction toward an outlet of the agglomerating section 3. The inner passage bounded by the wall portion 6 is cup-shaped or trough-shaped. Whereas the wall portion 6 is shown in FIG. 2 as a separate member, it is to be understood that such a portion may be formed of one-piece with the agglomerating section 3 so that a wall of the latter forms the wall portion 6. The wall portion 6 reinforces the wall of the agglomerating section 3.

The dust-aspirating arrangement further has separating means which is identified by reference numeral 7. The separating means 7 has a casing 8 which bounds a chamber communicating with the agglomerating section 3. A plurality of stripping blades 9 are arranged in a stack and mounted on a frame within the chamber bounded by the casing 8. The stack of blades 9 is inclined relative to the casing 8 of the separating means 7.

A conduit 10 communicates with the inner chamber of the separating means and is arranged for removing the dust-containing liquid which is separated from the air in the separating means 7. The conduit 10 is flexible and may be formed as a flexible pipe. As shown in FIG. 2, it can be bent so as to assume a siphon-type contour where the dust containing moisture unimpededly flows through the conduit 10 and backflow of the same is prevented. On the other hand, the conduit 10 may be unbent so as to assume a straight contour for the purpose of cleaning of the conduit 10 by a cleaning medium admitted therein. The conduit 10 may be detachably connected with the separating means 7 so that it can be detached from the latter for the purpose of cleaning. Such a detachable connection is known per se in the art and for this reason is not shown in the drawing.

The arrangement has a blower which is identified by reference numeral 11 and communicates with the chamber of the separating means through an air removing conduit 12. The air which is separated from the dust-containing liquid in the separating means 7 is draw from the latter through the conduit 12 by the blower 11 and induced into a muffler 13. The blower 11 performs both the function of aspirating the dust containing air through the tubular member 2 and other parts of the arrangement communicating therewith, and the function of removing the separated air from the separating means 7. The conduit 12 and the blower 11 are located downstream of the conduit 10 of the separating means 7. Therefore, these parts are not subjected to the action of the dust or the dust-containing liquid.

The above-described arrangement operates in the following manner. Under the action of the blower 11 the dust-containing air is aspirated by the portions 2' and 2" of the angled tubular conduit 2. The thus-aspirated dust-containing air travels through the connecting conduit 4 into the agglomerating section 3 wherein it is moisturized by a moistening liquid issued from the nozzles 5. The liquid and the dust-containing air are induced by the wall portion 6 into the central region of the agglomerating section 3 wherein a mixture of the above-mentioned components is produced. The mixture is admitted into the separating means 7 wherein it is separated by the blades 9 into its constituent dust-containing liquid and air. The dust-containing liquid is removed from the separating means 7 through the flexible conduit 10. The separated air is aspirated by the blower 11 through the removing conduit 12, induced by the blower 11 into the muffler 13, and thereupon is readmitted into the underground working space.

It will be understood that each of the elements described above, or two or more together may also find a useful application in other types of constructions differing from the types described above.

While the invention has been illustrated and described as embodied in a dust-aspirating arrangement for underground applications, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with an underground machine tool, a dust aspirating arrangement comprising suction means for aspirating air which contains dust generated during operation of an underground machine having the tool, said suction means including an angled tubular element which has two portions each having an inlet arranged for aspirating the dust-containing air, said portions being arranged relative to one another so that one of said portions can aspirate dust in the region adjacent to the tool whereas the other portion can aspirate dust in the region of a floor whereto dust is advanced during operation; agglomerating means communicating with said suction means and arranged for receiving the dust-containing air aspirated by the latter, said agglomerating means being provided with a moisturizing element arranged for moisturizing said dust-containing air, and with a curved stationary wall portion arranged for inducing the moisture and the dust-containing air toward a central region of said agglomerating means so as to produce a mixture, said curved stationary wall portion simultaneously reinforcing said agglomerating means; separating means communicating with said agglomerating means and operative for separating said mixture into its constituent dust-containing moisture and air, said separating means including a casing bounding a chamber which has a longitudinal axis, a frame member located in said chamber, and a plurality of blade members supported by said frame member, said frame member and thereby said blade members being inclined to said longitudinal axis of said chamber, said separating means having a flexible conduit which is arranged for removing the separated dust-containing moisture, said flexible conduit being bendable between a first position in which it is curved so as to form a siphon-type conduit through which the separated dust-containing moisture unimpededly flows but backflow of the same is prevented, and a second position in which it is straight so as to permit cleaning of the same; and means for removing the separated air from said separating means and located downstream of said flexible conduit.

2. An arrangement as defined in claim 1, wherein said suction means includes a source of suction communicating with said angled element so as to aspirate the dust-containing air into the latter.

3. An arrangement as defined in claim 2, wherein said source of suction communicates with said air removing means so as to simultaneously remove the separated air from said separating means through said removing means.

4. An arrangement as defined in claim 3, wherein said source of suction is a blower.

5. An arrangement as defined in claim 4, wherein said removing means is a conduit which is open into said separating means and communicates with said blower so that the separated air is removed from said separating means through said conduit under the action of said blower.

6. An arrangement as defined in claim 1; and further comprising flexible connecting means arranged for pivotally connecting and communicating said angled tubular element of said suction means with said agglomerating means.

7. An arrangement as defined in claim 6, wherein said connecting means includes a flexible conduit.

8. An arrangement as defined in claim 1, wherein said moisturizing element includes at least one nozzle.

9. An arrangement as defined in claim 1, wherein said agglomerating means includes a tubular member bounding an inner passage and having a curved section which is of one piece with said tubular member so as to form said stationary wall portion and to reinforce said tubular member.

10. An arrangement as defined in claim 1, wherein said agglomerating means includes a tubular member bounding an inner passage, said wall portion being located in said passage and reinforcing said tubular member.

11. An arrangement as defined in claim 10, wherein said wall portion bounds a further inner passage which converges in a direction toward said separating means.

12. An arrangement as defined in claim 11, wherein said further inner passage is cup-shaped.

13. An arrangement as defined in claim 1, wherein said flexible conduit is detachably connected with said separating means.

14. An arrangement as defined in claim 1, wherein said angled tubular element of said suction means is a one-piece angled member having a longer tubular arm forming said one portion aspirating dust in the region adjacent to the tool of the machine, and a shorter tubular arm forming said other portion aspirating dust in the region of a floor.

* * * * *